L. G. LANGSTAFF.
VESSEL FOR DISPENSING LIQUIDS.
APPLICATION FILED JAN. 6, 1906.
901,714.
Patented Oct. 20, 1908.
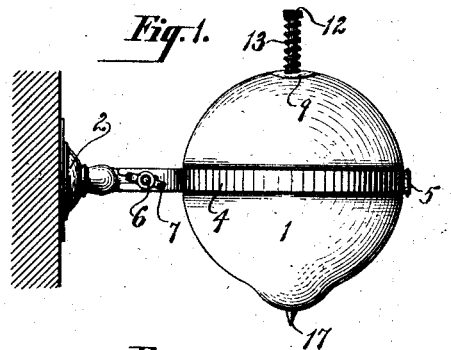
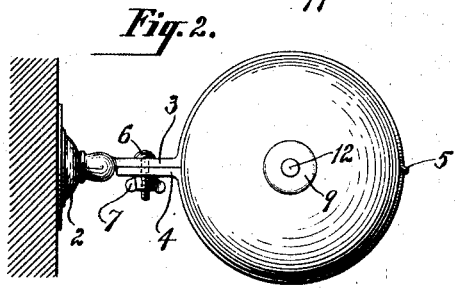
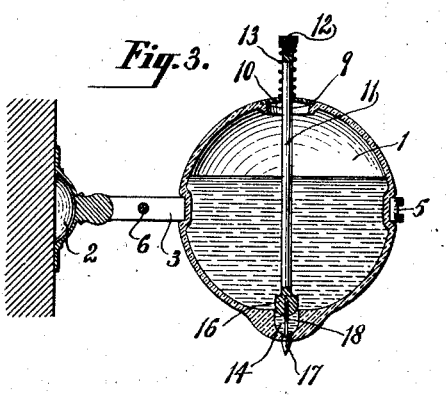
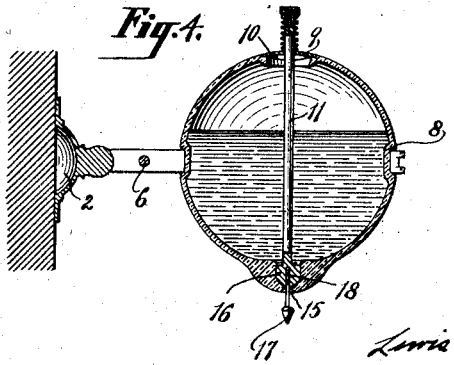

UNITED STATES PATENT OFFICE.

LEWIS G. LANGSTAFF, OF NEW YORK, N. Y.

VESSEL FOR DISPENSING LIQUIDS.

No. 901,714.  Specification of Letters Patent.  Patented Oct. 20, 1908.

Application filed January 6, 1906. Serial No. 294,818.

*To all whom it may concern:*

Be it known that I, LEWIS G. LANGSTAFF, a citizen of the United States, and resident of the borough of Brooklyn, in the city and State of New York, have invented a new and useful Improvement in Vessels for Dispensing Liquids, of which the following is a specification.

My invention relates to an improvement in vessels for dispensing liquids and has for its object to provide a very simple and effective device for insuring the delivery of a predetermined quantity of liquid from a vessel.

The invention is more particularly directed to vessels for dispensing liquid soap.

A practical embodiment of my invention is represented in the accompanying drawings in which Figure 1 is a side view of my improved vessel and means for supporting the same, Fig. 2 is a top plan view, Fig. 3 is a vertical central section, the piston being shown in its normal raised position, and Fig. 4 is a similar section showing the piston depressed.

The vessel is herein represented of hollow spherical form and is denoted by 1. A supporting bracket for the vessel comprises a suitable base 2 fitted to be secured to a wall or other support, which base is provided with a metallic band encircling the vessel. The metallic band is, in the present instance, shown as sectional and comprises two arms 3 and 4 hinged, as shown at 5, and adapted to be removably clamped together by means of a screw bolt 6 and thumb nut 7.

The vessel 1 may be provided with a circumferential groove 8 for receiving therein the band to permit the bracket to more securely and firmly hold the vessel in place. The vessel 1 is provided with a filling mouth 9 in its top, which mouth is closed by a removable cap 10.

A piston rod 11 passes upwardly through the center of the vessel 1 and the cap 10. A knob or handle 12 is screwed into or otherwise secured to the upper end of the piston rod 11 above the cap 10 and a suitable expansion spring 13 surrounds the piston rod 11 between the knob or handle 12 and the cap 10 for normally holding the piston rod raised.

A dispensing chamber 14 is formed in the bottom of the vessel 1, which dispensing chamber has a contracted discharge mouth 15 through the bottom of the vessel.

The piston rod 11 is provided with a head 16 which is arranged to fit within the dispensing chamber 14.

A stopper 17 is located exterior to the vessel beneath its bottom and it is provided with a screw threaded shank 18 which passes upwardly through the contracted discharge mouth 15 of the dispensing chamber into engagement with the piston head 16. This stopper 17 is arranged to close the mouth 15 when the piston is in its normal raised position.

By screwing or unscrewing the stopper 17, the amount of opening left between the piston head and the top of the dispensing chamber when the piston is in its raised position may be accurately adjusted for permitting a more or less rapid flow of the liquid from within the vessel into the dispensing chamber.

In operation, supposing it be desired to dispense a predetermined amount of liquid soap from within the vessel, one hand of the operator is placed beneath the discharge mouth of the dispensing chamber, ready to receive the soap as it is discharged therefrom, and the other hand of the operator may then depress the piston thus causing the piston head to enter the chamber and the stopper 17 to open the discharge mouth of the chamber, thereby permitting the piston head to force the liquid in front of the same out through the discharge mouth into the hand of the operator. The piston may then be released, thus permitting it to spring back into its normal raised position with the stopper 17 closing the discharge mouth of the dispensing chamber.

It is to be understood that I do not wish to limit myself to the specific form of bracket herein shown and described, and it is evident that the shape of the vessel may be varied and that the vessel may be made of any suitable material; hence I do not wish to limit myself strictly to the structure herein set forth, but

What I claim is:—

A liquid dispensing vessel including a dispensing chamber having a discharge mouth, a piston for forcing liquid from the dispensing chamber, said piston having its rod projecting exterior to the vessel, a handle on the rod, a stopper carried by the piston exterior to the vessel arranged to open and close the discharge mouth, said stopper having its shank passing up through the discharge mouth and the dispensing chamber and adjustably engaged with the piston, and a spring interposed between the top of the vessel and the handle arranged to normally hold the piston raised and the discharge mouth closed.

In testimony, that I claim the foregoing as my invention, I have signed my name in presence of two witnesses, this 8th day of December 1905.

LEWIS G. LANGSTAFF.

Witnesses:
FREDK. HAYNES,
F. GEORGE BARRY.